US008356028B2

(12) United States Patent
Lamping

(10) Patent No.: US 8,356,028 B2
(45) Date of Patent: Jan. 15, 2013

(54) FLEXIBLE DATA STRUCTURE IN AN INFORMATION SYSTEM HAVING A COMPUTER READABLE MEDIUM

(75) Inventor: John O. Lamping, Los Altos, CA (US)

(73) Assignee: Xerox Corporation, Norwalk, CT (US)

( * ) Notice: Subject to any disclaimer, the term of this patent is extended or adjusted under 35 U.S.C. 154(b) by 229 days.

(21) Appl. No.: 11/018,183

(22) Filed: Dec. 20, 2004

(65) Prior Publication Data

US 2005/0102269 A1    May 12, 2005

Related U.S. Application Data

(63) Continuation of application No. 09/450,239, filed on Nov. 29, 1999, now abandoned.

(51) Int. Cl.
*G06F 7/00* (2006.01)
*G06F 17/00* (2006.01)
(52) U.S. Cl. ......... 707/714; 707/713; 707/715; 707/716
(58) Field of Classification Search .................. 707/1–5, 707/100, 102, 104.1, 200, 713, 714, 715, 707/716; 706/45–50; 715/503, 509
See application file for complete search history.

(56) References Cited

U.S. PATENT DOCUMENTS

| | | | | |
|---|---|---|---|---|
| 5,295,256 A * | 3/1994 | Bapat | ............................ | 717/137 |
| 5,418,943 A * | 5/1995 | Borgida et al. | .................... | 707/4 |
| 5,555,403 A * | 9/1996 | Cambot et al. | .................... | 707/4 |
| 5,584,024 A * | 12/1996 | Shwartz | ............................ | 707/4 |
| 5,630,122 A * | 5/1997 | Kaplan et al. | ...................... | 707/4 |
| 5,784,887 A * | 7/1998 | Chow et al. | ...................... | 60/657 |
| 5,999,914 A * | 12/1999 | Blinn et al. | ...................... | 705/26 |
| 6,012,067 A * | 1/2000 | Sarkar | ....................... | 707/103 R |
| 6,035,298 A * | 3/2000 | McKearney | ..................... | 707/10 |
| 6,122,649 A * | 9/2000 | Kanerva et al. | ............... | 715/210 |
| 6,205,453 B1 * | 3/2001 | Tucker et al. | ................. | 715/503 |
| 6,330,554 B1 * | 12/2001 | Altschuler et al. | .............. | 706/21 |
| 6,460,043 B1 * | 10/2002 | Tabbara et al. | ............... | 707/100 |
| 6,473,898 B1 * | 10/2002 | Waugh et al. | ................. | 717/168 |

FOREIGN PATENT DOCUMENTS

| | | | | |
|---|---|---|---|---|
| CA | 2465584 | * | 10/2004 | ........................ 17/30 |
| EP | 1647901 | * | 4/2005 | ........................ 17/30 |
| WO | WO 03/096230 | * | 11/2003 | ........................ 17/30 |

OTHER PUBLICATIONS

Sakti P Ghosh, "Numerical operations on a relational database", IEEE transaction on software engineering, vol. 15,No. 5, May 1999, pp. 600.*

Jorng-Tzong Horng et al. "design and implementation of a relatinal query language with teams", TENCON'93 proceedings, computer, communication control and power engineering, conference 1993, vol. 1, pp. 339-342.*

Dourish, P., et al., "Extending Document Management Systems with User-Specific Active Properties," ACM Transactions on Information Systems, vol. 18 , Issue 2, pp. 140-170, Apr. 2000.

* cited by examiner

*Primary Examiner* — Ann Chempakaseril
(74) *Attorney, Agent, or Firm* — Fliesler Meyer LLP

(57) ABSTRACT

An information system having a computer readable medium including a flexible data structure is provided. The data structure allows information entered into the data structure to be embellished or qualified. The flexible data structure increases the ability of the data structure to record exceptional information pertinent to specific circumstances. The flexible data structure also enables database access software to respond to user queries in a more effective and informative manner.

19 Claims, 7 Drawing Sheets

| PART # | NAME | SUPPLIER | ADDRESS |
|---|---|---|---|
| 5 | WIDGET | ACME | TUCSON |
| 6 | CANNON | ACME | TUCSON |
| 8 | SCREW | BETA | SAN FRANCISCO |

FIG. 1A (a) "Kim's fax number is 555-1234"
(b) "Kim's fax number is 555-1234, and is a home fax" → embellishment
(c) "For the next two weeks, Kim's fax number will be 555-1234" → qualification

FIG. 1B

TELEPHONE TABLE 200

| NAME | FAX NUMBER |
|---|---|
| KIM | 555-1234 |
| JOE | 755-1734 |
| BRYAN | 885-9204 |

EMBELLISH TABLE 210

| NAME | FAX NUMBER | HOME FAX NUMBER |
|---|---|---|
| KIM | 555-1234 | YES |
| JOE | 755-1734 | YES |
| BRYAN | 885-9204 | NO |

QUALIFICATION TABLE 210

| NAME | FAX NUMBER | VALID TIME |
|---|---|---|
| KIM | 555-1234 | NEXT TWO WEEKS |
| KIM | 535-1884 | AFTER NEXT TWO WEEKS |

FIG. 2

| NAME | HOME PHONE | VALID TIME |
|---|---|---|
| KIM | 555-1234 | NEXT TWO WEEKS |

TELEPHONE TABLE 400

| IDENTIFICATION | NAME | FAX NUMBER |
|---|---|---|
| 5 | KIM | 555-1234 |
| 6 | JOE | 755-1734 |
| 7 | BRYAN | 885-9204 |

EMBELLISH AND QUALIFICATION TABLE 410

| IDENTIFICATION | EXTENSION | TYPE | VALUE |
|---|---|---|---|
| 5 | HOME FAX | EMBELL | YES |
| 6 | VALID TIME | QUALIFICATION | NEXT TWO WEEKS |
| 7 | VALID TIME | QUALIFICATION | AFTER NEXT TWO WEEKS |

FIG. 4

EMBELLISH AND
QUALIFICATION
EXTENSION
TABLE
510

| IDENTIFICATION | EXTENSION ID | VALUE |
|---|---|---|
| 5 | 28 | YES |
| 5 | 43 | NEXT TWO WEEKS |
| 7 | 43 | AFTER NEXT TWO WEEKS |

EMBELLISH AND
QUALIFICATION
EXTENSION
TABLE
520

| EXTENSION ID | NAME | TYPE |
|---|---|---|
| 28 | ANSWERING MACHINE | EMBELL |
| 43 | VALID TIME | QUALIFICATION |

FIG. 5

FLEXIBLE DATA STRUCTURE IN AN INFORMATION SYSTEM HAVING A COMPUTER READABLE MEDIUM

FIELD OF THE INVENTION

The present invention relates to storing and retrieving information in and from an information system having a computer readable medium, and in particular, a data structure in a computer readable medium.

BACKGROUND OF THE INVENTION

Imagine filling in the fax number field of your friend Kim in your software organizer, such as Contact Manager by Microsoft, Redmond, Wash. But Kim has two fax numbers, one at home and one at the office. Or Kim is about to go on vacation, so for the next two weeks, there will be a different fax number. Or, Kim has two fax numbers at the office, one for a new, sophisticated, color fax machine which should be used if you want to send a color fax, and a plain one for black and white faxes.

Or imagine recording the source of a document you are adding to your group's document management system. Typically, the source is the person who wrote and sent you the document, but the document may be written by one person and sent to you by another, or the document consists of several parts, each written by a different person. Or the document is an official document from an organization, and both the organization and the individual who prepared the document are sources, in different senses.

Current information systems having a computer readable medium generally do not adequately address many of these situations. Typically, information systems require a system designer to prescribe a data model with a specific data structure. Traditional styles of data structures, such as relational structures, or entity-relationship structures, provide a fixed data structure in a database. For example, the only information that users can store or access in a relational data model are those listed as columns in a table. Typically, the information in each column depends on a key or a set of information in a predetermined column. For example, FIG. 1A illustrates a typical relational database 100 with rows 101*a-c* and columns 102*a-d*. Each row includes the part number, name of the part, supplier of the part, and supplier address. A key is column 102*a*.

System designers determine what kinds of information will be stored and accessed, select a particular level of detail for that information, and, most importantly, decide what each piece of information can depend on. This rigid data structure is maintained throughout the system, and users are required to make their interactions conform to this data structure.

While this rigid data structure may be useful in certain applications, it is much less appropriate for personal or collaborative information systems, including document management systems, where the user's task is much less defined, and their information might depend on any number of factors.

This means that typical relational databases can not always record important information and then provide it in response to queries. For example, if a user queried database 100 asking for suppliers of part # "5" and the "ACME" supplier was discontinuing part # "5" at the end of the year, a query to a rigid data structure would not provide the user with this valuable information.

Therefore, it is desirable to allow a user to store and retrieve information based on the circumstances of each situation. The user should also be able to define the level of detail of the stored information, and most importantly, the dependencies of the information. The information should be stored in a manner that minimizes memory usage and reduces the likelihood of erroneous data entry. The stored information should also enable a more informative response to a query.

SUMMARY OF THE INVENTION

An improved information system including a computer readable medium having a flexible data structure is provided. The information system allows a user to enter and retrieve various levels of detailed information based on user defined circumstances. The information system comprises a processor for storing and retrieving information and a computer readable medium for storing a flexible data structure. The computer readable medium includes a data structure having a first memory location storing first statement information. A second memory location storing information qualifying the first statement information.

According to another aspect of the present invention, the computer readable medium includes a third memory location storing embellishment information of the first statement information.

According to another aspect of the present invention, the first statement information includes document properties.

According to another aspect of the present information, a computer readable medium includes a first table storing the first statement information and a second table storing the qualification information.

According to another aspect of the present invention, the computer readable medium includes a first table storing identity information and the first statement information. A second table stores the identity information, embellishment information, and qualification information.

According to another aspect of the invention, the information system processes a query and the statement information and qualification information is provided in response to the query.

According to another aspect of the present invention, an article of manufacture including a computer readable memory having a flexible data structure is provided. The data structure comprises a first memory location storing statement information and a second memory location storing qualification information of the statement information. A third memory location stores embellishment information of the statement information.

According to another aspect of the present invention, a method for storing information in a database is provided. The method includes obtaining a statement having embellishment information and qualification information. A determination is then made whether the statement includes embellishment information or qualification information. The statement information, embellishment information and qualification information is then stored. A query may be provided and a response will contain the embellishment information and qualification information.

Other aspects and advantages of the present invention can be seen upon review of the figures, the detailed description, and the claims which follow. In the figures, like reference numerals indicate like components.

BRIEF DESCRIPTION OF THE DRAWINGS

FIG. 1A illustrates a typical data structure containing information;

FIG. 1B shows example statements of relevant information stored in a flexible data structure;

FIG. 2 illustrates a data structure having an embellishment table and qualification table, according to an embodiment of the present invention;

FIG. 3 illustrates a data structure having an embellishment record and qualification record, according to an embodiment of the present invention;

FIG. 4 illustrates a telephone table and qualification/embellishment table, according to an embodiment of the present invention;

FIG. 5 illustrates an embellishment and qualification extension table, according to an embodiment of the present invention;

DETAILED DESCRIPTION

Figure 6:
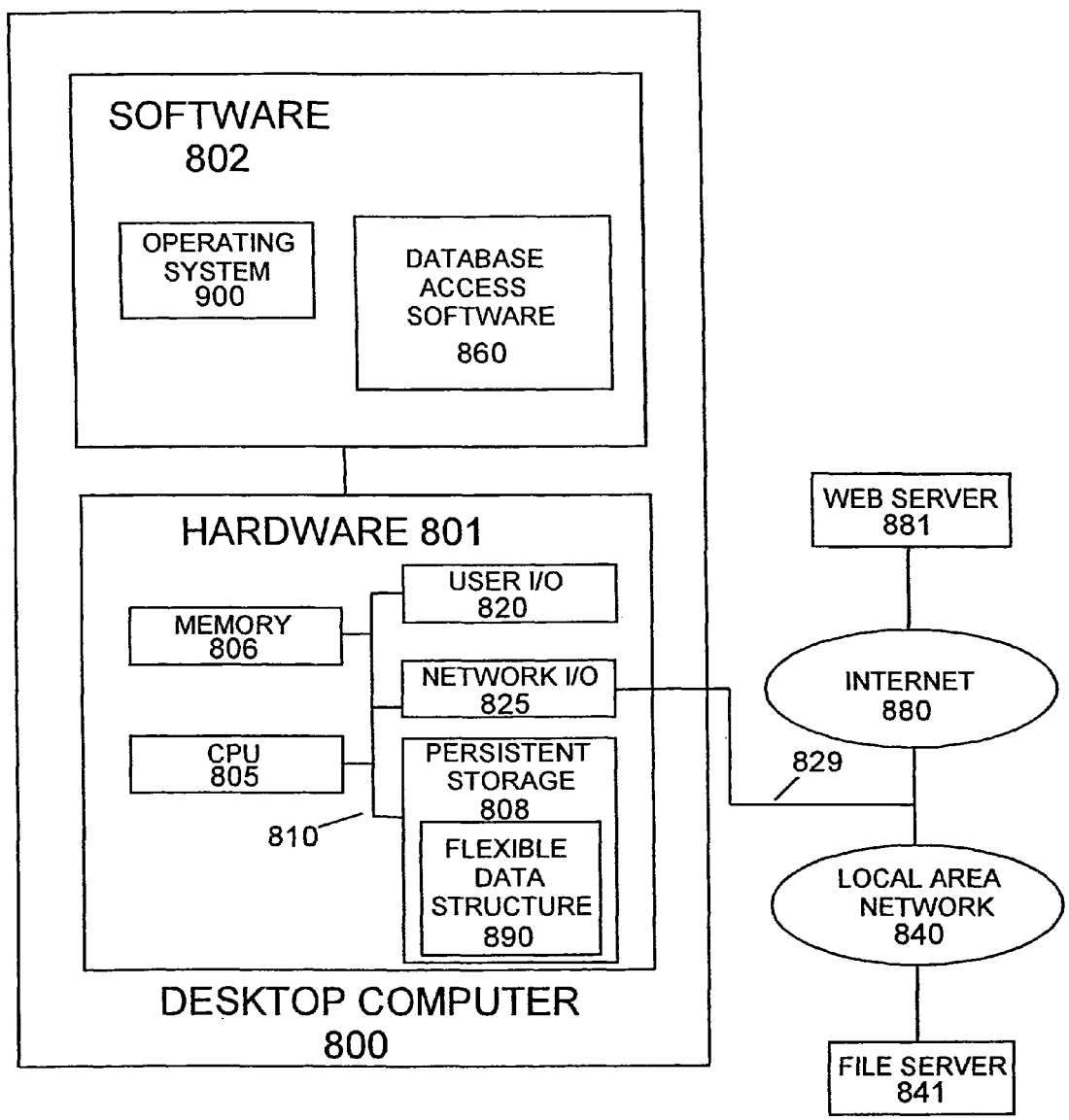
FIG. 6 illustrates a hardware and software embodiment of the present invention; and, FIG. 7 illustrates a method for storing embellishment information and qualification information according to an embodiment of the present invention.

A data retrieval system such as property based document system, having a flexible data structure is provided. The data structure has a level of detail which is not fixed by the system, but rather is adjustable on a case-by-case basis by a user. Information is stored in the data retrieval system by parsing or otherwise processing statements which include relevant information and properties. Any statement can be augmented with optional properties. In an embodiment, there are two kinds of optional properties: (1) embellishments, which provide additional information, and (2) qualifications, which impose contextual limitations.

Optional Properties

A flexible data structure allows a user to provide more or less explicit information about any particular situation. For example, the following statements shown in FIG. 1B include relevant information to be stored in a flexible data structure:

(a) "Kim's fax number is 555-1234"

(b) "Kim's fax number is 555-1234, and is a home fax"

(c) "For the next two weeks, Kim's fax number will be 555-1234"

Statements (b) 106 and (c) 108 each mention different properties that statement (a) 104 ignores. Clearly, adding either of these properties modifies the meaning of statement (a). But, these two optional properties exemplify two fundamentally different ways to modify the information in statement (a). The additional property in statement (b) is an embellishment 110. It makes statement (a) stronger by adding to what it says about the situation. In this case, it adds that the fax number is a home fax number. Other examples are "Kim's color fax number is 555-1234" or "Kim's fax number, located in Palo Alto, is 555-1234."

In contrast, the additional property in statement (c) works in the opposite direction: it is a qualification 112. It makes statement (a) a weaker statement by placing contextual limitations on when statement (c) applies. In this case, the fax number is only valid for a limited time. Similar examples would be going from "Joe is the author of this document" to "Joe is the author of the second section of this document," or going from "this document is interesting," to "Joe thinks this document is interesting."

In some ways, a qualification resembles a precondition of a statement. But it is not strictly a logical antecedent in the sense of propositional logic because it does not give conditions, which if true, imply that the statement is true. Rather, it gives a restriction on what circumstances the statement pertains to.

The invention relates to optional properties in general, but particularly qualification properties, especially as distinguished from embellishment properties. In an embodiment, some optional properties are qualification properties. In some embodiments, other optional properties may be embellishment properties.

FIG. 2 illustrates a data structure for storing information which includes embellishment and qualification properties.

Telephone table 200 includes rows 201a-c and columns 202a-b. In particular, column 202a includes the names of individuals and their corresponding or dependent fax numbers are stored in column 202b. Each row of this table represents information, stored in a computer readable medium, from a statement which may be provided by a user or processing device.

Embellish table 210 includes relevant embellishment properties. Embellish table 210 includes columns 212a-c and rows 211a-c. Specifically, column 212a identifies the individuals with their corresponding fax number in column 212b. The embellishment property value of a home fax number is stored in column 212c.

Qualification table 210 illustrates the storing of a qualification property value. Similar to tables 200 and 210, individual names are positioned in column 212a with corresponding fax numbers stored in column 212b. A qualification property value of when the fax number is valid is stored in column 212c.

FIG. 3 illustrates an alternate embodiment of storing embellishment and qualification properties in an information system and, in particular, in a computer readable medium. Embellishment and qualification properties may be stored in an extended record in an embodiment. Record 300 illustrates a record in which the first field 312a is used to identify an individual. Consecutive field 312b is used to store the individual's fax number and consecutive field 312c is used to store a valid time or qualification property value. Record 300, as a whole, determines both a statement and a qualification. In alternate embodiments, consecutive property value 312c stores an embellishment property value.

FIG. 4 illustrates an alternate embodiment of storing embellishment and qualification property values. Telephone table 400 includes rows 401a-c and columns 402a-c. Column 402a includes an identification tag associated with the information of each statement represented in Table 400. A fax number for each individual in column 402b is stored in column 402c.

Embellish and qualification property values are then stored in an embellish and qualification table 410 associated with the identification tags and values. For example, column 412a stores the identification tags while column 412b stores the property associated with that particular identification tag. Property type values are then stored in column 412c with property values stored in column 412d. This data structure embodiment is slightly more complicated than the above embodiments and it is not as efficient if more statements have qualifications or embellishments, all of the same type. But the data structure illustrated by FIG. 4 provides more flexibility in that it facilitates multiple different kinds of embellishment, and it is more efficient if most kinds of qualification or embellishment apply to only a small fraction of the statements. This data structure embodiment allows for quicker retrieval of information and less memory usage.

FIG. 5 illustrates an alternate embodiment of an embellish and qualification extension table. Embellish and qualification extension table 510 includes rows 501a-c and columns 502a-c. Column 502a is used to store identification tags. Column 502b includes extension ID values corresponding to respective identification tags and column 502c includes embellish and qualification values. The extension IDs in column 502b are used to point to embellish and qualification properties and types. The tables illustrated in FIG. 5 allow for reduced memory usage and reduces the likelihood of entering erroneous data. The redundant information for extension 43 is identified twice in table 510 but the information is only stored once in table 520.

Figure 7:
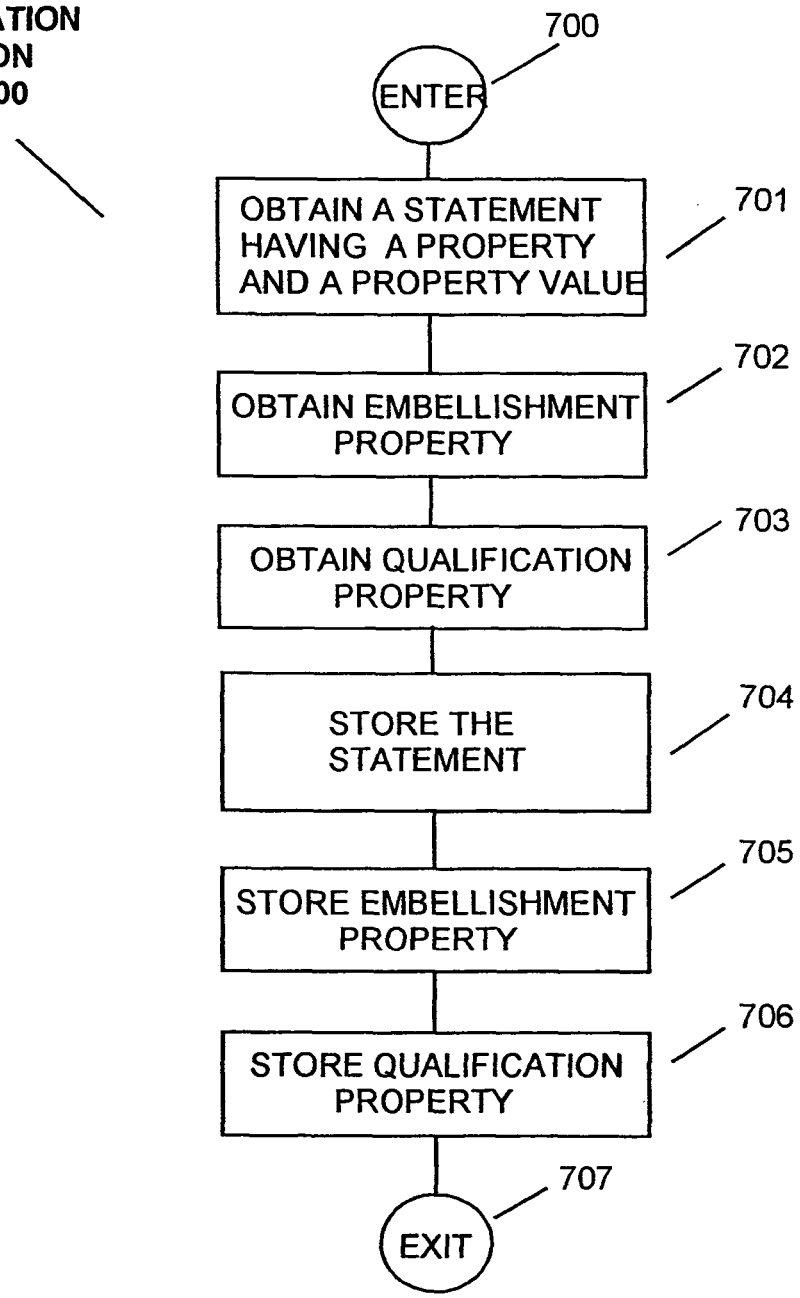

FIG. 7 illustrates storing embellishment and qualification information method 700. In an embodiment, FIG. 7 illustrates the software included in database access software 860, illustrated in FIG. 6. In alternate embodiments, the steps illustrated in FIG. 7 may be accomplished manually, by hardware or software, or a combination thereof.

After method 700 is entered as illustrated by circular logic 700, a statement having embellishments and qualifications is obtained as illustrated by logic block 701. An embellishment property is obtained from the statement, if present, in logic block 702. A qualification property is then obtained from the statement, if present, in logic block 703. The statement is stored as illustrated by logic block 704. The embellishment property and value is stored in logic block 705 and the qualification property and value is stored in logic block 706. The respective information may be stored in tables as illustrated by FIGS. 2-5. The method exits as illustrated by circular logic 707. In an embodiment, a user may then be provided with stored information in response to a query as described below.

Queries

In an embodiment, a user is provided with important information in the form of embellishment and qualification property values in response to a query. This information is provided even if the user does not explicitly query for the information. If a user queries an information system, "What is Kim's fax number?" and the information system has a stronger, embellished, "Kim's fax number is 555-1234, and this is a home fax", information stored on a computer readable medium, the system responds, "Kim's fax number is 555-1234, and this is a home fax." But if the system has the weaker, restricted, "For the next two weeks, Kim's fax number is 555-1234" information stored, then the system will have to respond "For the next two weeks, Kim's fax number is 555-1234." Alternatively, if the information system has "Kim's fax number is 555-1234" stored and is queried the embellished, "What is Kim's home fax number?" the system will have to state "Kim has a fax number of 555-1234, but it is not known if this is a home fax." But if the system is queried the restricted "What is Kim's fax number for the next two weeks?" then the system responds "Kim's fax number is 555-1234."

When the information system stores information with optional properties, the two kinds of properties can cause similar looking responses to some queries. But the responses will be for very different reasons. Suppose the information system is queried, "What is Kim's fax number?" and the system has the restricted stored information: "For the next two weeks, Kim's fax number is 555-1234"; "For the rest of the time, Kim's fax number is 535-1884".

In an embodiment, the system responds, "For the next two weeks Kim's fax number is 555-1234, and the rest of the time, its 535-1884". Alternatively, if the system stores the embellished information, "Kim's home fax number is 555-1234"; "Kim's office fax number is 555-4321"; then the system would respond, "Kim has a home fax at 555-1234 and an office fax at 555-4321."

In the first case, the information system must qualify a response, because no single telephone number would be correct. In the second case, the system has a surplus of information, two fax numbers, either of which satisfies the query. But the query presumes that there is only one number, so the system explains how the query's presumption is an oversimplification. In both cases, there is a property axis, either time or location, along which the fax number varies. In the first case, the query presumes that the number is the same at all times, while in the second case, it presumes that there is only one location with a number. In either case, the most informative response is to point out how things are richer along the offending axis than the query presumes.

In an embodiment, a query can be accompanied by context information indicating that certain restrictions are known to hold. The query then treats statements with those restrictions, or with any restrictions implied by the context as if the statements did not have those restrictions. For example, "What is Kim's fax number?" with a context indicating that the query only applied to the next day, and the system has the restricted stored information: "For the next two weeks, Kim's fax number is 555-1234", the system would respond "Kim's fax number is 555-1234" because the qualification on the stored statement was implied by the context of the query.

Refinement

Both embellishment and qualification properties can come in various degrees of refinement. A user may specify a "home" or "office" as two possible values for a "location" property. But a user might want to give more precise information about a fax location, such as "private office" or "workgroup's area."

In general, specifying information about a property need not be an either/or proposition, but rather can fall on a spectrum of specificity. Giving finer information about a property value strengthens its effect. Thus, giving finer information for an embellishment value yields a stronger statement. The opposite holds for qualifications.

Formal Model

This section describes a formal logical interpretation of a flexible data structure model.

Some data structure models directly assign a truth-value to each statement. But that would not capture the intuition of flexible data structure that a statement gives partial information about some situation. The flexible data structure model instead stores the circumstances that statements describe. These circumstances will be finely individuated facts of the world. For example, a circumstance is "At 5:04:36 on Mar. 25, 1998, Kim has a Xerox Document WorkCentre Pro 545 fax machine, at home, at 432 Waverly, in Palo Alto, in the home office room, at number 555-1234, in operational condition, not currently receiving or sending, with white US letter paper loaded, . . . " As this illustrates, a circumstance resembles an impossible detailed statement, both extremely embellished and extremely restricted. Of all the possible circumstances, some will be true, and some will not be true. A flexible data structure model records which circumstances are true, and this determines which statements are true.

Properties are what can be observed about circumstances. Properties are how the user thinks of the structure of circumstances. A property can be thought of as a relation between circumstances and some property value domain. For example, the value domain of the "phone number" property are telephone numbers. The "phone number" property holds between a circumstance and a number if that is the telephone number of that circumstance. Since properties are relations, and not just functions, the value domain can be structured.

In an embodiment, the value domain can be a hierarchy. So a "fax" property could have a value domain including "Xerox", "Xerox Document WorkCentre", and "Xerox Document WorkCentre Pro 545" as successive refinements.

Typically, particular circumstances are too detailed to be named by statements. Users refer to sets of circumstances indirectly through primitive statements. Since statements are less precise than circumstances, they give partial information about a range of circumstances. The primitive statement "Kim's fax number is 555-1234" says that for every time, there is a circumstance that includes the properties of Kim owning a fax, at that time, with number 555-1234. To capture this, the model relates statements and circumstances. Since it can take a whole set of circumstances to satisfy a statement, and since there may be several different sets that could satisfy it, the model maps from statements to sets of circumstances. These sets of circumstances are the satisfaction sets of the statement. A statement is true if all the circumstances in one of its satisfaction sets hold.

Primitive statements relate to properties two ways: syntactically and semantically. Syntactically, statements consist of a set of <property:value>pairs. "Kim's fax is 555-1234" would be something like {<type:fax-machine>, <owner:Kim>, <phone-number:555-1234>}. If the statement needs to indicate a particular relation, that can be stored with a relation property. Semantically, statements are about only those circumstances having the properties they mention. In other words, the properties of a statement pick out a subspace of the space of all circumstances, and the statement says something about that subspace. In terms of the flexible data storage model, each circumstance in each satisfaction set of the statement will satisfy all the properties of the statement.

Table 1 below summarizes the formal model.

TABLE 1

A model consists of:
    A set, C, of circumstances
    A subset H, of C, of circumstances that actually hold.
    A family $V_1, ..., V_m$ of value spaces.
    A family $P_1, ..., P_n$ of properties, each Pi a relation between C and some $V_{mi}$.
    The set S, of primitive statements: all finite sets of
        <$P_i$: $v_j$>pairs, where $vi \in V_{mi}$.
    A satisfaction map, M, from S to sets of non-empty subsets
        of C, where $\forall s \in S$, $\forall <P_i: v_j> \in s$, $\forall C \in M(s)$, $\forall c \in C$,
        $P_i(c, v_j)$.
A primitive statement, s, is true in the model if and only if
    $\exists C \in M(s)$, $C \subseteq H$.

There may also be differences between embellishment properties and qualification properties, or of any of the other kinds of structure properties can have. The structure of properties requires conditions on the model, such as in the form of subset relationships. Adding an embellishment property to a statement yields a statement whose satisfaction sets are a subset of those of the original statement. A qualification property is the converse.

Information System and Computer Readable Medium

FIG. 6 shows hardware and software components of an exemplary information system suitable for storing and retrieving a flexible data structure, according to an embodiment of the present invention. The system of FIG. 6 includes a general-purpose computer 800 connected by one or more communication pathways, such as connection 829, to a local-area network (LAN) 840 and also to a wide-area network, here illustrated as the Internet 880. Through LAN 840, computer 800 can communicate with other local computers, such as a file server 841. Through the Internet 880, computer 800 can communicate with other computers, both local and remote, such as World Wide Web server 881. As will be appreciated, the connection from computer 800 to Internet 880 can be made in various ways, e.g., directly via connection 829 (wired or wireless), or through local-area network 840, or by modem (not shown).

Computer 800 is a personal or office computer that can be, for example, a workstation, personal computer, personal digital assistant, or other single-user or multi-user computer system; an exemplary embodiment uses a Sun SPARC-20 workstation (Sun Microsystems, Inc., Mountain View, Calif.). In an alternate embodiment, computer 800 may be a large main frame computer. For purposes of exposition, computer 800 can be conveniently divided into hardware components 801 and software components 802; however, persons of skill in the art will appreciate that this division is conceptual and somewhat arbitrary, and that the line between hardware and software is not a hard and fast one. Further, it will be appreciated that the line between a host computer and its attached peripherals is not a hard and fast one, and that in particular, components that are considered peripherals of some computers are considered integral parts of other computers. Thus, for example, user I/O 820 can include a keyboard, a touch screen, a mouse, and a display monitor, each of which can be considered either a peripheral device or part of the computer itself, and can further include a local printer, which is typically considered to be a peripheral. As another example, persistent storage 808 can include a CD-ROM (compact disc read-only memory) unit, which can be either peripheral or built into the computer.

Hardware components 801 include a processor (CPU) 805, memory 806, persistent storage 808, user I/O 820, and network interface 825. These components are well understood by those of skill in the art and, accordingly, need be explained only briefly here.

Processor 805 can be, for example, a microprocessor or a collection of microprocessors configured for multiprocessing. It will be appreciated that the role of computer 800 can be taken in some embodiments by multiple computers acting together (distributed computation); in such embodiments, the functionality of computer 800 in the system of FIG. 6 is taken on by the combination of these computers, and the processing capabilities of processor 805 are provided by the combined processors of the multiple computers.

Memory 806 can include a computer readable medium such as read-only memory (ROM), random-access memory (RAM), virtual memory, or other memory technologies, singly or in combination. Persistent storage 808 can include a computer readable medium, for example, a magnetic hard disk, a floppy disk, or other persistent read-write data storage technologies, singly or in combination. It can further include mass or archival storage, such as can be provided by CD-ROM or other large-capacity storage technology. (Note that file server 841 provides additional storage capability that processor 805 can use.) In an embodiment, persistent storage 808 stores a flexible data structure 890. In embodiments, flexible data structure 890 is stored as illustrated in FIGS. 2-5.

User I/O (input/output) hardware 820 typically includes a visual display monitor such as a CRT or flat-panel display, an alphanumeric keyboard, and a mouse or other pointing device, and optionally can further include a printer, an optical scanner, or other devices for user input and output. In an embodiment, user I/O 820 is used to input value statements into flexible data structure 890. Also in an embodiment, user I/O 820 is used to provide statements and queries.

Network I/O hardware 825 provides an interface between computer 800 and the outside world. More specifically, network I/O 825 lets processor 805 communicate via connection 829 with other processors and devices through LAN 840 and through the Internet 880.

Software components 802 include an operating system 900 and a set of tasks under control of operating system 900, such as a database access software 860. In an embodiment, database access software 860 includes Structured Query Language ("SQL") software which responds to database queries. As known by one of ordinary skill in the art, operating system 900 also allows processor 805 to control various devices such as persistent storage 808, user I/O 820, and network interface 825. Processor 805 executes the software of operating system 900 and its tasks in conjunction with memory 806 and other components of computer system 800.

In an embodiment, database access software 860 and flexible data structure 890 singly or in combination is stored on a computer readable medium such as a magnetic hard disc, floppy disc, CD-ROM, or other writeable data storage technologies, singly or in combination.

Persons of skill in the art will appreciate that the systems of FIG. 6 are intended to be illustrative, not restrictive, and that a wide variety of computational, communications, and information and document processing devices can be used in place of or in addition to what is shown in FIG. 6. For example, connections through the Internet 880 generally involve packet switching by intermediate router computers (not shown), and computer 800 is likely to access any number of Web servers, including but by no means limited to Web server 881, during a typical Web client session.

The foregoing description of the preferred embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

The claimed invention is:

1. A property-based document system comprising:
   a computer including a computer readable medium and a processor, operating thereon, for storing and retrieving information;
   a flexible data model permitting a user to provide information which includes a plurality of statements and one or more optional properties, wherein when the user provides the information the system is adapted to
      obtain, from the information, and store, in a first table, the plurality of statements, wherein each statement includes an identification tag and comprises one or more property value pairs, and wherein each statement includes document properties,
      obtain, from the information, and store, in a second table, the one or more optional properties which each augment one of the plurality of statements, wherein the first table and the second table are stored separately within the flexible data model, wherein each optional property identifies its associated statement using that statement's identification tag, and wherein the one or more optional properties include
         one or more embellishments which provide additional information related to its associated statement, and
         one or more qualifications which define a circumstance and limit its associated statement to apply in that circumstance, and
      associate statements stored in the first table with optional properties stored in the second table using each statement's identification tag;
   wherein the one or more optional properties include one or more relations between a set of circumstances and a property value domain, wherein the property value domain is a hierarchy; and
   wherein when a query is received at the system, the system
      determines a response to the query, wherein the response includes a particular statement from the first table, and wherein the particular statement includes information explicitly requested in the query,
      determines that a particular optional property stored in the second table is associated with the particular statement in the flexible data model using the particular statement's identification tag, wherein the particular optional property includes information relevant to the particular statement, and wherein the information included in the particular optional property was not explicitly requested in the query,
      retrieves the particular statement from the first table and the particular optional property associated with the particular statement from the second table, and
      augments the particular statement in the response with the particular optional property associated with the particular statement to create an augmented response, and
      returns the augmented response to the user including the particular statement augmented with the particular optional property associated with the particular statement.

2. The property-based document system of claim 1, wherein the embellishment makes the statement stronger by adding to the statement.

3. The property-based document system of claim 1, wherein the qualification makes the statement weaker by restricting the statement.

4. The property-based document system of claim 1, wherein the property-based document system adds a qualification to an answer because no single answer would be correct.

5. The property-based document system of claim 1, wherein the property-based document system identifies when the query is an oversimplification.

6. The property-based document system of claim 1, wherein embellishments and qualifications have various degrees of refinement.

7. The property-based document system of claim 6, wherein finer information for an embellishment yields a stronger statement.

8. The property-based document system of claim 6, wherein finer information for a qualification yields a weaker statement.

9. The property-based document system of claim 1, wherein statements store a relation property.

10. A computer-readable storage medium having instructions stored thereon for a property-based document system, that when executed cause the system to:
    permit, by a flexible data model, a user to provide information which includes a plurality of statements and one or more optional properties, wherein when the user provides the information the system is adapted to
       obtain, from the information, and store, in a first table, the plurality of statements, wherein each statement includes an identification tag and comprises one or more property value pairs, and wherein the statement includes document properties, obtain, from the information, and store, in a second table, the one or more optional properties which each augment one of the plurality of statements, wherein the first table and the second table are stored separately within the flexible data model, wherein each optional property identifies its associated statement using that statement's identification tag, and wherein the one or more optional properties include
  one or more embellishments which provide additional information related to its associated statement, and
  one or more qualifications which define a circumstance and limit its associated statement to apply in that circumstance;
associate statements stored in the first table with optional properties stored in the second table using each statement's identification tag;
wherein the one or more optional properties include one or more relations between a set of circumstances and a property value domain, wherein the property value domain is a hierarchy; and
wherein when a query is received at the system, the system
  determines a response to the query, wherein the response includes a particular statement from the first table, and wherein the particular statement includes information explicitly requested in the query,
  determines that a particular optional property stored in the second table is associated with the particular statement in the flexible data model using the particular statement's identification tag, wherein the particular optional property includes information relevant to the particular statement, wherein the information included in the particular optional property was not explicitly requested in the query,
  retrieves the particular statement from the first table and the particular optional property associated with the particular statement from the second table,
  augments the particular statement in the response with the particular optional property associated with the particular statement to create an augmented response, and
  returns the augmented response to the user including the particular statement augmented with the particular optional property associated with the particular statement.

11. The computer-readable storage medium of claim 10, wherein the embellishment makes the statement stronger by adding to the statement.

12. The computer-readable storage medium of claim 10, wherein the qualification makes the statement weaker by restricting the statement.

13. The computer-readable storage medium of claim 10, wherein the property-based document system adds a qualification to an answer because no single answer would be correct.

14. The computer-readable storage medium of claim 10, wherein the property-based document system identifies when the query is an oversimplification.

15. The computer-readable storage medium of claim 10, wherein embellishments and qualifications have various degrees of refinement.

16. The computer-readable storage medium of claim 15, wherein finer information for an embellishment yields a stronger statement.

17. The computer-readable storage medium of claim 15, wherein finer information for a qualification yields a weaker statement.

18. The computer-readable storage medium of claim 10, wherein statements store a relation property.

19. The system of claim 1, wherein a statement is true if all the circumstances in a satisfaction set hold.

* * * * *